United States Patent [19]

Strauff

[11] 4,022,110
[45] May 10, 1977

[54] HYDRAULIC PRESSURE-REGULATING SYSTEM

[75] Inventor: Günther Strauff, Kaarst, Germany

[73] Assignee: Langen & Co., Dusseldorf, Germany

[22] Filed: Dec. 15, 1975

[21] Appl. No.: 640,905

[30] Foreign Application Priority Data

Dec. 21, 1974 Germany ............................ 2460877
Feb. 26, 1975 Germany ............................ 2508367

[52] U.S. Cl. ............................... 91/371; 91/375 A; 91/465
[51] Int. Cl.² .......................................... F15B 9/10
[58] Field of Search ................. 91/375 A, 370, 371, 91/372, 373, 434

[56] References Cited

UNITED STATES PATENTS 3,772,962  11/1973  Suzuki ............................. 91/375 A
3,855,904  12/1974  Jablonsky ........................ 91/372
3,922,953  12/1975  Strauff ............................ 91/434
3,927,604  12/1975  Jablonsky ........................ 91/434

FOREIGN PATENTS OR APPLICATIONS 1,920,826  11/1970  Germany ........................ 91/375 A Primary Examiner—Paul E. Maslousky
Attorney, Agent, or Firm—Holman & Stern

[57] ABSTRACT

A hydraulic pressure-regulating system for a dual-functioning servo motor having a control valve device that permits direct manual operation of the servo motor output function up to a predetermined force whereupon servo assistance arises when the fingers of the input member take up a set lost motion and directly contact and mechanically operate the control pistons. A prestressed spring holds the pistons in a neutral position to maintain a desired initial pressure in the system.

8 Claims, 3 Drawing Figures

HYDRAULIC PRESSURE-REGULATING SYSTEM

BACKGROUND OF THE INVENTION

The instant invention relates to a hydraulic pressure-regulating system for directional control of a dual-functioning servo motor, especially for servo-steering of motor vehicles. More specifically, it relates to a system comprising a control valve device which comprises two control pistons serving as valve members for the control of the flow of pressure fluid from one pressure fluid source to the working spaces, or the return flow of pressure fluid from the working spaces of the servo motor to be accomplished in one operation. Each control piston is associated with one working space of the servo motor, and has a means for manually activating the control pistons dependent on one relative movement between a power input member and a power output member. The power output member is connected with the power input member by means of elastic resilient connecting means whereby the power output member is connected with the operational-active portion of the servo motor, for example, with its working piston. The displacement of the working-active portion is based on the control valve device and the control pistons are provided with reaction areas which are stressed by the pressure in the working spaces of the servo motor in such a manner so that each working space is provided with such a reaction area. The activating of the control pistons is made by means of fingers or the like which are connected with the power input member; the fingers engaging or entering the cavities of the control pistons and being in position to carry along the control pistons in both directions of adjustment. A device is provided, which already in the neutral position of the control pistons, produces a predetermined initial pressure in the working spaces of the servo motor.

In a similar pressure control system of the "closed-center construction" (U.S. Pat. No. 3,952,631), an initial pressure is produced in that the control pistons are at the front section activated via a bilateral lever under inter-connection of helical springs, in a manner so that the helical springs are pre-stressed in the neutral position, and the pressure on the reactional areas of the control pistons is counter-effective to the springs. For obtaining a less strong, purely mechanical transmission of the force-component from the power input member to the power output member, push rods are proposed between the control pistons and the lever. These push rods enter into a fixed mechanical contact with the control pistons only after a certain relative movement between lever and control pistons. A utilization of this principle of control pistons which are not activated at the front section but by means of fingers which reach into recesses, or cavities, and with regard to this function are disclosed in the German Pat. No. 1,133,642, would result in a construction in which the srings support themselves on the fingers, and at that side of a control piston which is facing the reaction area would affect the inside of the same against a stop member. The inside would thereby have to be sealed from the reaction area and between fingers and control pistons there would have to exist in both operation directions a certain amount of play. Such a type of construction in and of itself is fully functional and would fulfill also the presented requirements with regard to initial pressure in the neutral position, mechanical power transmission without servo assistance below an operating force limit and automatic return positioning of the steered wheels in the straight-forward position. Nevertheless, there result cases in which the above-described arrangement of the spring has proven to be disadvantageous. One such case developes when the control piston is constructed as a single- or multi-sectional differential piston, and the reaction area represents the front area with the smaller diameter. Since it is often impossible, especially at high initial pressures, to place the spring within such a small diameter, the portion having the larger diameter of the piston would have to be unnecessarily long in shape, thus increasing the structural size of the entire control valve means. The second case connected with disadvantages occurs when a reaction power limitation is proposed with the assistance of a pressure-limiting valve which is arranged within the control piston. Since such a pressure-limiting valve does have certain axial dimensions, additional mounting space for the spring would have to be provided. The same disadvantages result in the utilization of the above-described principles in control valve devices of the open-center-construction. Even though the spring is in such a case not necessary per se for the purpose of producing the initial pressure, because this initial pressure already developes by means of a throttle effect of the flow of pressure medium. The spring, however, keeps the initial pressure constant, that is, independent of variations of the power flow and the viscosity, and thereby improves the steering behavior in various environmental conditions.

OBJECT AND SUMMARY OF THE INVENTION

It is therefore the object of the present invention to construct hydraulic pressure control systems of the above-mentioned type in a manner whereby in a closed-center-construction, a predetermined initial pressure in the working spaces of the servo motor will already be obtained in a neutral position of the control pistons, a mechanical power transmission component without hydraulic reinforcing will be possible below a predetermined operating force limit or will become possible in parallel with an increased hyraulic component, and finally, the automatic returning into their initial straight-forward position of the vehicle wheels is obtainable. In an open-center-construction, it is intended to obtain a tolerance flow-through and viscosity-independent constant value of the initial pressure. The structure is possible in a simple, economical and space-saving manner, especially also in a case where within the control piston there will be arranged a pressure-limiting device for limiting the reaction pressures, or, when the reaction area is provided at the grade of smaller diameters of a stepped control piston, in single or multi-sectional structure.

The solution of this problem is inventively accomplished in that the cavity in one control piston with respect to the finger or the like is measured so that based on a neutral position there will exist a lost motion between the control pistons and the fingers in both operational directions, at least in the size-order of the relative path of the control piston with respect to the finger under automatic return-positioning of the steered vehicle wheels with a predetermined speed of return to the normal position, or, in the size order of the relative path until a mechanical contact is reached between the fingers and the control pistons. A spring is arranged between a housing-fixed block member and, at least in the neutral position, is prestressed in a manner so that the spring will retain the equilibrium of the force which is placed on the reaction area by the initial pressure thereby acting as a stabilizing means.

As long as in the frame of the lost motion, there is no contact between the finger and the control piston, said control piston will operate like the piston of a pressure-regulating valve, which retains the pressure in the associated working chamber at a constant value. This pressure, for example, 2 to 5 bar, is the initial pressure. However, if the finger comes into contact with the control piston, the said control piston is then forcibly activated in the sense of manually-operated three-position/three-way valve. In the comparatively small control strokes, the influence of the spring is then disregardable, if one selects a spring having lower spring-constants. Even though the supporting of the spring on a housing-fixed block member results in a principally different construction than in the supporting on the finger, one obtains practically the same operating characteristics. By means of the support on the housing, one obtains the advantageous possibility to permit the spring to affect the front area which faces away from the reaction area, or, however, to guide same into one of the cavities extending from these front areas in the inside of the control pistons with a portion of its length.

Further advantages and characteristics are seen from the following disclosure and claims.

BRIEF DESCRIPTION OF THE DRAWINGS

The instant invention is explained in greater detail by means of the illustrations showing various embodiments, wherein.

DETAILED DESCRIPTION OF PREFERRED EMBODIMENTS

Figure 1:
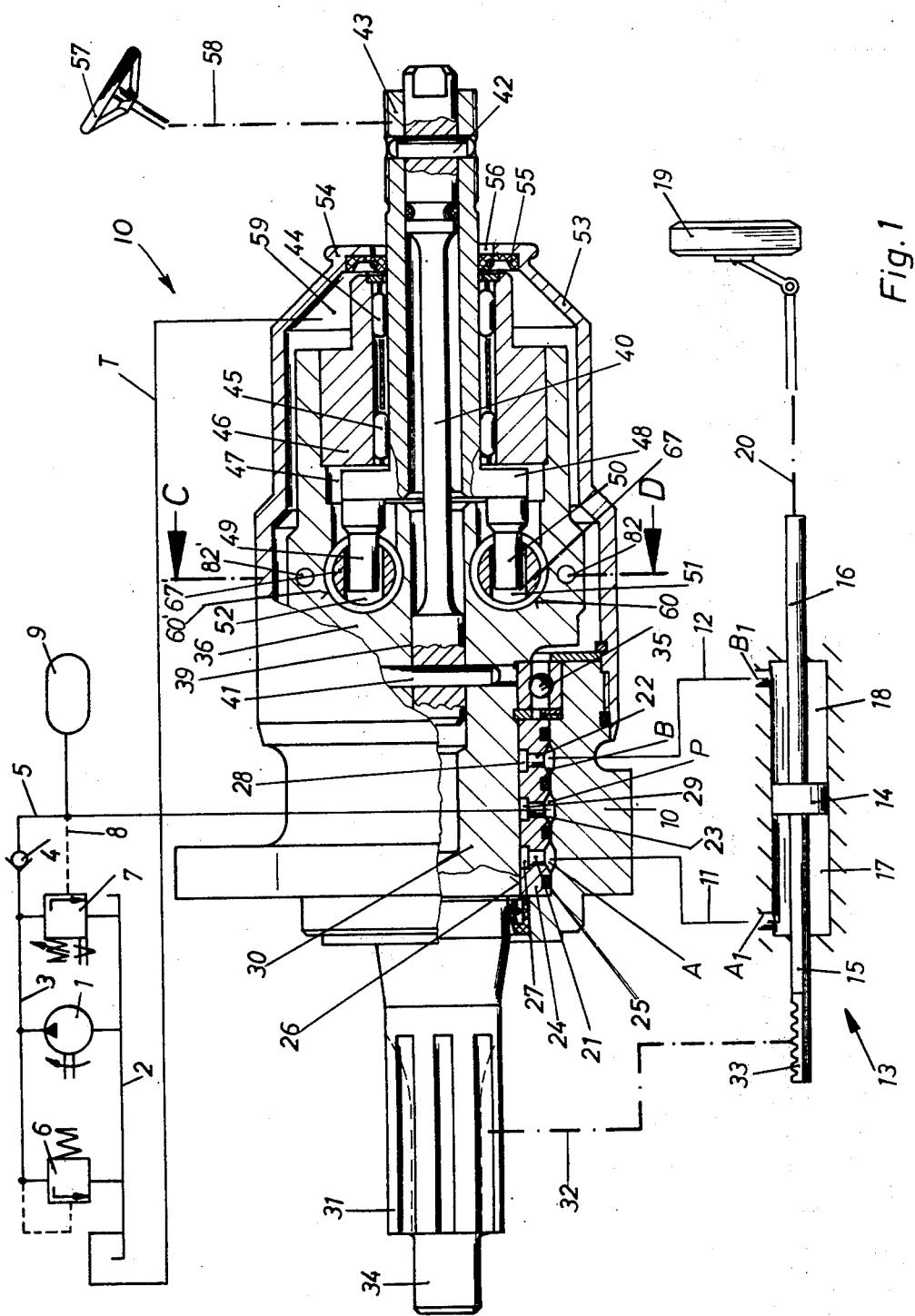
FIG. 1 shows a pressure-control system in a partially symbolical form with a control valve device shown in cross-section along its axis and perpendicular to the control pistons.

A pressure fluid source 1 sucks pressure fluid from a pressure reservoir 2 and transmits same into a pressure pipe 3 which is connected with a pressure pipe 5 by means of a non-return or check valve 4. The pressure in the pressure pipe 3 is limited by means of a pressure-limiting valve 6. Furthermore, there is provided a shut-off valve 7, between the pressure pipe 3 and the pressure reservoir 2, which is switched on and off under dependence of the pressure in the pressure pipe 5 via a control pipe 8. the pressure pipe 5, to which is connected an accumulator 9, terminates within a connecting member 10 of a control valve device 10' in a connection which is not shown in detail, and which connection is connected with an annular tee-slot P inside the connecting member 10.

Adjacent the annular tee-slot P are located two further annular tee-slots A and B, which are in communication with connections (not shown in detail) from which lines 11 and 12 lead to connections $A_1$ and $B_1$ of a servo motor 13. For simplicity reasons, the pressure pipes 3 and 5 and the lines 11 and 12 are referred to as an interconnecting means and are illustrated up to the annular tee-slots P, A and B. The servo motor 13 is provided at its inside portion with a piston 14, which is fixedly connected with bilateral piston rods 15 and 16, and thusly divides working spaces 17 and 18 in the inside portion of the servo motor 13. Connection $A_1$ terminates into the working space 17, while connection $B_1$ terminates into the working space 18. The piston rod 16 is in operative communication with the steered vehicle wheels, of which one wheel 19 is illustrated. The operational connection is symbolically illustrated by means of the broken line 20. Opposite to the annular tee-slots A, B and P are placed cross-bores 21, 22 and 23, which are located in a sleeve 24. Sleeve 24 is arranged at the inside of the connecting member 10 with a certain amount of radial play, whereby the thusly developing slot is sealed by means of sealing members 25. The sleeve 24 is provided with an inner bore 26. The cross-bores 21, 22 and 23 terminate in annular tee-slots 27, 28 and 29 which are concentrically arranged to the bore 26. The sleeve 24 is penetrated by a power output member 30 with a very small radial play, which extends outwardly beyond the connecting member 10, and is at that point shaped in the form of a pinion 31. As indicated by the broken line 32, the pinion 31 is operatively associated with a toothed segment or rack 33 which is connected with the piston rod 15. The pinion 31 extends into a trunnion 34, which is positioned in a bearing (not shown in detail). The power output member 30 is furthermore positioned in the connecting member 10 by means of bearing 35. In a portion 36 which extends beyond the connecting member 10 towards the other side, there is proposed the power output member 30 for receiving two control pistons 37 and 38.

The power output member 30 is provided with an inner bore 39, into which extends an elastic resilient connecting means 40, e.g., a torsion rod which, with the assistance of a cross pin 41, is connected with the power output member 30. The torsion rod 40 is connected fixedly with a power input member 43 at its other end by means of a cross pin 42, wherein the power input member 43 is positioned in a sleeve 46 by means of bearings 44, and 45, with the sleeve 46 being fixedly connected with the portion 36.

In a hollow space 47, which is formed between sleeve 46 and portion 36, the power input member 43 is formed into a dual-lever 48 (bilateral lever), which at its ends is provided with axially-parallelly directed fingers 49 and 50, which engage cavities 51 and 52 within the control pistons 37 and 38 with play, in a manner which is described in greater detail hereinbelow. The portion 36 as well as the sleeve 46 are enclosed by means of a pot-shaped lid 53 with distance, which lid is attached to the connecting member 10 and is provided at its bottom portion 54 with a penetration 56 for the power input member 43, by means of a sealing member 55.

Figure 2:
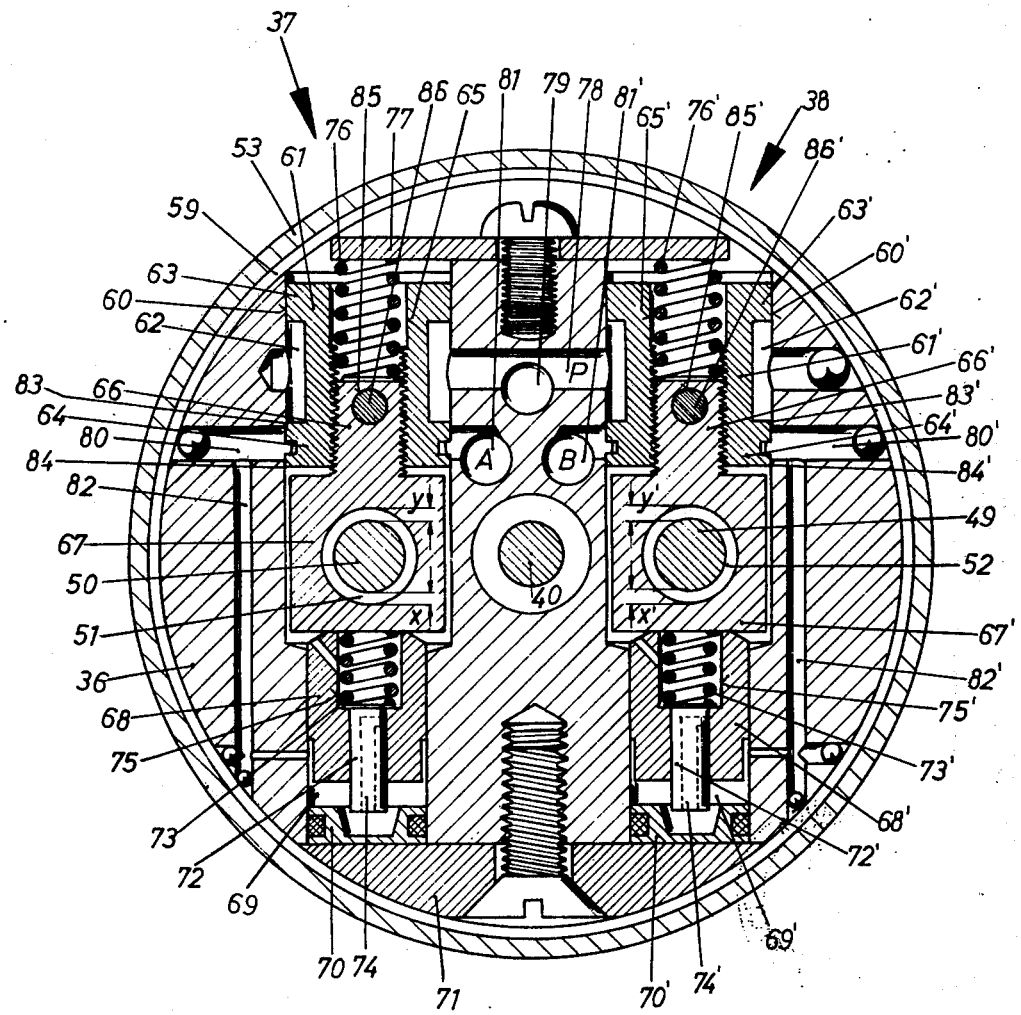
FIG. 2 shows a cross-section according to line C–D of FIG. 1.

The power input member 43 is connected with a steering wheel 57, as indicated by line 58. The open space within the lid 53 is indicated by numeral 59 and is connected with the storage reservoir 2 by means of a connection extending from pipe T in a manner not shown in detail. The control pistons 37 and 38 are comprised of several individual sections (FIG. 2). The control piston 37 is provided with a control portion 61 which is slidably arranged tightly in a bore 60 of the portion 36, which control portion 61 is provided with shoulders 63 and 64 which are separated by means of an annular tee-slot 62. Inside the control portion 61 there is provided a penetration bore 65, which in part is provided with a threading into which is screwed a plug-shaped extension 66 of a piston portion 67. In order to prevent double-centering, the piston portion 67 is provided in the surrounding bore 60 with radial play and vertical to its axis is provided with the cavity 51 into which communicates the finger 50 with an overall play. On its front area, facing away from the plug-shaped extension 66, the piston portion 67 comes into contact with a single portion of the control piston 37 which is indicated as reaction piston 68.

The reaction piston 68 is limited on its free front area by means of reaction area 69, which is sealed opposite the space 59 by means of a sealing plug 70, which is retained in position by means of a threaded cover plate 71. In the inside of the reaction piston 68, a piston 72 is slidably arranged which is stressed by a spring 73; the other end of said spring supporting itself on the piston portion 67. Inside the piston 72 there is arranged a relief channel 74 which extends from the reaction chamber 69 and which opens up after a certain stroke of the piston 72 into a bore 75 which receives the spring 73, whereby the bore 75 is in connection with the space 47, or the space 59, and therewith with the pipe T. Inside the bore 65 there is arranged a spring 76 which supports itself on a plate 77 fixed in the housing 36. In the area of the annular tee-slot 62 terminates a pressure-channel 78, which is in connection with the channels 79, and outside the plane of the drawing, in the power outlet member 30 with the annular tee-slot 29, and therewith with the annular tee-slot P. In order to obtain a clearer understanding, the pressure channel 78 is also additionally indicated with P. In the neutral position of the control piston 37, the shoulder 64 seals off a channel 80, which is in communication with channels 81 (not shown in detail) in the power output member 30 with the annular tee-slot 27 and therewith also with the annular tee-slot A. The channel 80 is therefore additionally indicated with "A". A channel 82 connects the channel 80 with the reaction area 69. The play which exists between the finger 50 and the side of the cavity 51 which is facing the reaction piston 68, is indicated with x, while the play between finger 50 and the side of the cavity 51 which is facing the control portion 61 is indicated with y. The edges of the shoulder 64 are termed control edges 83 and 84. In the extension 66, a crossbore 85 is provided which serves for the reception of a synthetic plug 86 or the like. The synthetic plug 86 extends bilaterally up into the threaded portion and serves therefore as a safety means against torsion.

The control piston 83 is totally identical with the control piston 37 so that corresponding portions thereof have the identical reference numerals but provided with a prime symbol. The channel 78 terminates accordingly into an annular tee-slot 62', while shoulder 64' seals a channel 80' in a neutral position, which channel is connected with the annular tee-slot 28 or the annualar tee-slot B by means of channel 81'. For reasons of simplicity, channel 80' is also indicated with the letter "B".

In order to explain the function of the system, it is assumed at first that the accumulator means 9 is empty, the pressure fluid source 1 is not producing and no outside forces affect the steered vehicle wheels 19. Since the working spaces 17 and 18 as well as the reaction areas 69 and 69' would then be without pressure, the springs 76 and 76' would then displace the control pistons 37 and 38 to such an extent until they abut the fingers 50 and 49. In such a position, the control edges 83 and 83' would then have produced the connections P-A and P-B. If now the pressure fluid source 1 begins to produce, pressure would then flow through these connections into the working chambers 17 and 18 and would in said working chambers cause a pressure increase which could continue to flow, among other places, also into the reaction areas 69 and 69' which are communicating with the working spaces 17 and 18. The pressure increase at that location, after overcoming the initial stresses of the springs 76 and 76', effects there a displacement of the control pistons 37 and 38 against the force of the springs. The power transmission is made from the reaction piston 68 and 68' via the piston portion 67 and 67' with the plug-shaped extension 66 and 66' to the spring 76 and 76' and simultaneously to the control portion 63 and 63'. The displacement of the control pistons 37 and 38 is taking place under increasing throttling of the connections P-A and P-B for a length of time until finally the control edges 83 and 83' interrupt these connections. The expression "interrupt" means thereby that even though there are no large flows taking place except downflow from the control edges 83 and 83', there will develop leakages to an extent so that the pressure in the reaction areas 69 and 69' remains constant. This position is illustrated in FIG. 2. The pressure is the "initial pressure". If then the steering wheel 57 is turned clockwise, the power input member 43 and the lever 48 with the fingers 49 and 50 will also move clock-wise. The torsion rod 40 is thereby stressed to some extent so that a relative movement takes place between the power input member 43 and the power output member 30. According to this relative movement, the fingers 49 and 50 move relative to the piston portions 67' and 67. The plays x' and y become thereby smaller.

Two differing cases are hereafter presented. In the first case, it should be assumed that the motor vehicle, as an example, is driven on an icy road so that the force required for the steering of the wheels is very low and the available initial stress of the torsion rod 40 suffices to move the wheels 19 and the servo piston 14, which, however, may thereby perform a movement to the left. The working space 18 is thereby increasing so that the pressure prevailing therein will at least for a short period of time be reduced. The force in the reaction area 69' is therefore also somewhat lower and the spring 76' pushes the control piston 38 into a position in which the control edge 83' will open the connection P-B somewhat further. It should be pointed out that this will not effect any increase, but only the reduction of the initial pressure is being balanced. In the reverse manner, the working space 17 reduces itself, whereby in that space and in the reaction area 70 there develops a pressure increase. This pressure increase effects a displacement of the control piston 37 against the force of the spring 76 for an extent of time until the control edge 84 will open up and produce the connection A-T so that pressure is able to flow from the working space 17 to the pressure reservoir 2. The control piston 37 functions therefore also as piston of a pressure-regulating valve.

In order to now come to an explanation of the second case, it is assumed that the stress of the torsion rod 40 will not suffice to produce a movement of the steered wheels 19. The fingers 49 and 50 will in that case move relative to the piston portions 67' and 67 for an extent of time until the plays x' and y have disappeared and a mechanical contact has taken place. In a further movement of the fingers 49 and 50, the control pistons 37 and 38 are then forcibly moved along. Thereby, the control edge 83' opens finally the connection P-B. Pressure is able to flow into the working space 18 and this enables a build-up of pressure therein and thereby supports the desired displacement of the servo piston 14 or the movement of the wheels 19. Since a positive initial pressure is prevailing in the system $B_1$, 12, B, 22, 28, 81', 80' (B), there will take place the overflow of pressure without a "hissing" sound or any other form of noise. Additionally, air-generations are prevented and the servo piston 14 is hydraulically fixed.

The size of pressure increase depends on the force produced at the steering wheel 57 which force depends upon the reaction force on the reaction piston 68' which is produced in the reaction area 70' above the initial pressure. The mechanical contact between the finger 50 and the piston portion 67 effects a displacement of the control piston 37 to such an extent that the control edge 84 produces the connection from the channel 80 to the bore 60, which in that area is connected with the space 59 (see FIG. 1). In other words, the working space 17 will be connected with the pipe T which corresponds with the connection A-T. The pressure increase in the working chamber 18 may maximally increase until reaching the opening pressure of the pressure limiting valve 6. The pressure increase in the reaction area 69' and therewith the reaction force is, however, limited to a low value since at this value the piston 72' is displaced relative to the reaction piston 68' to an extent against the force of the spring 73' so that the relief channel 74' opens into the bore 75'. Since the inflow of pressure from the channel 82' into the reaction area 69' takes place under throttled conditions, an undesired strong outflow of pressure is thereby prevented. It should finally also be pointed out that the automatic return-positioning of the steered wheels of the vehicle into the straight-ahead position will cause similar results as the further above-described steering without hydraulic servo assistance. The only difference lies wherein that for once the servo piston 14 is moved by means of the power output member 30, and for the other, by means of the outer forces which affect the wheels. The possibility of the automatic return-positioning is especially important in cases where instead of the torsion rod 40 there are being utilized pre-stressed elastic resilient connecting means. In order to enable a predetermined return-positioning speed, the plays $x$ and $x'$ must have a predetermined size, since the flow-through crosscut of A to T or of B to T depends on this play. The size of the plays $y$ and $y'$ depends on the fact of what type of purely mechanical power transmission member is desired up to the activation of the hydraulic servo support. The plays should not be made unnecessarily large since they could then effect the steering behavior under the loss of the hydraulic means. It should be clear that a turning of the steering wheel 57 counter-clockwise, or outer forces operating in another direction, would cause the same effects always for the other control piston. A detailed description is therefore not necessary.

Figure 3:
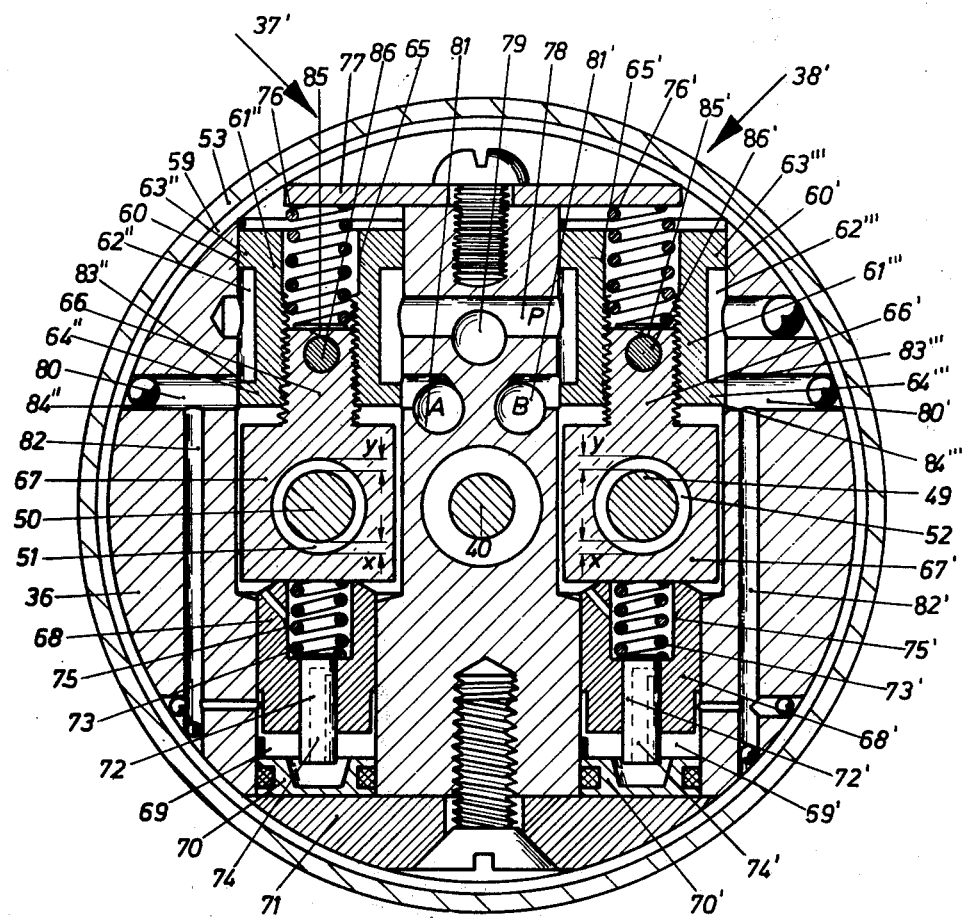
FIG. 3 illustrates a similar cross-section for a control valve device of the open-center construction.

Since, in the manufacture of the fingers 49 and 50 as well as the cavities 51 and 52, we are concerned with producing cylindrical profiles, it is possible to retain small tolerances in a relatively simple manner. This means that also the total play $x$ and $y$ can be very precisely tolerated. It is however practically impossible to obtain the correct plays $x$ and $y$ and simultaneously have the correct position of the control edges 83 and 84 without a means to make adjustments. With the assistance of the threaded portion in the through-bore 65, this difficulty can be overcome. The torsion rod 40 is suitably provided with a bore-hole and is provided with a pin according to the dimensions of the drawings, while the piston portion 67 and the control portion 61 are also firstly threaded in accordance with the drawing, which, for example, can be tested by means of inserting a gauge between piston portion 67 and shoulder 64. The synthetic, threaded plug 86 prevents thereby an automatic loosening after the mounting, or during the operation. After the mounting of the control portions 61 and 61' (the above-mentioned holds, of course, also true for the control pistons 61') the entire control valve system is mounted on a test-stand when the lid 53 is loosened, wherein the test stand permits the simulation of predetermined driving conditions. The plays $x$ and $y$ are not directly measured and adjusted, but they are resulting from the measured pressures and rotational momentum. When predetermined ideal values are not obtained, then the control portion 61 can be turned with the aid of a hand tool. The finger 50 serves thereby as a safety means against distortion for the piston portion 67. In such an adjusting process, the initial stress of spring 76 can change itself by a very small extent. In general, this is acceptable. Should the initial stress-change, however, be undesirable, it would then be recommended that the spring 76 be permitted to affect the control portion 61 directly, since this is accepting a fixed zero-position in contrast to the plate member 77. FIG. 3 illustrates the same cross-section as seen in FIG. 2, with the single exception that now control pistons 37' and 38' of the open-center construction are illustrated. The control portions 61'' and 61''' are provided with shoulders 64'' and 64''' having control edges 83'' and 83''' or 84'' and 84'''. The shoulders 64'' and 64''' are in their axial extension measured so that they will not completely seal off the channels 80 and 80' when the control pistons 37' and 38' are in the neutral position. The pressure flowing into the annular tee-slots 62'' and 62''' via the channel 78 has therefore the possibility, under formation of a predetermined back pressure (or pressure head) to flow into the channel 80 or into channel 80', and to build up therein also a predetermined pressure head, and in general be able to flow back to the pressure reservoir 2 via the space 47, the space 59 and the pipe T, past the control edges 84'' and 84'''. The pressure head in the channels 80 and 80' continues to flow also into the reaction areas 69 and 69' and works therein against the forceof the springs 76 an 76' in a manner so that, independent of the respective viscosity of the fluid, or the pressure in the channel 78 and eventually developing manufacturing tolerances, the slot on the control edges 83'' and 83''' or 84'' and 84''' is able to adjust so that the pressure in the channels 80 and 80', or in other words, the initial pressure is retained constant. This pressure-adjustment is maintained for so long until the fingers 50 and 49 contact the piston portions 67 and 67'. When the movement of the fingers 49 and 50 are thereby made in the clock-wise direction, then the piston portion 67' is moved downwards so that the slot on the control edges 83''–83''' will enlarge in size and increases in the channel 81' (B), since simultaneously the slot on the control edge 84''' reduces in size and therewith renders the outflow of pressure difficult. Simultaneously, the piston portion 67 is moved upwards so that the slot on the control edges 83" reduces in size and the inflow of pressure is increasingly throttled. This reduction corresponds with an increase of the slot on the control edges 84" so that pressure is able to increasingly flow from the channel 80, and effecting there a small reduction of pressure. The result is that in the working chamber 18 there takes place a pressure-increase, in the working chamber 17, however, the pressure is reduced. The servo piston 14 moves therefore towards the left and supports the movement initiated by the steering wheel 57. Also here, a rotation counter-clockwise effects the same functions always for the other control piston or the other working chamber. Also in this case, the mounting of all parts is firstly made according to the dimensions of the drawings. The adjustment of the control portion 61" relative to the piston portion 67 is made also herein again on a test-stand.

The instant invention is not limited to the embodiments as shown in the drawings. Thus, it is entirely possible to manufacture the control pistons in a single piece or in two sections. It is furthermore possible to construct the control parts differently with the aid of the piston forms which are common in three-stage valves. It is furthermore not absolutely necessary to utilize fingers which engage the bores of the control pistons. It is also conceivable to place grooves extending from the outer casing, into which engage bilateral levers or the like. Finally, the utilized helical springs themselves may, of course, be replaced by other forms of springs. Finally, it should also be noted that it is of no substance for the inventive idea if a single control valve or a so-called block control with an integrated gear are utilized, or when the illustrated torsion rod is replaced by prestressed connection means.

What I claimed is:

1. In a hydraulic pressure-regulating system for directional control of a dual-functioning servo motor having oppositely arranged working spaces, especially for servo steering motor vehicles, comprising
    a pressure fluid source;
    a pressure reservoir;
    an interconnecting means for enabling flow of fluid around the system; and
    a control valve device interposed between said source, said reservoir, and said servo motor having two piston bores comprising
        a power input member having two fingers;
        a power output member operatively associated with said servo motor;
        a housing enclosing said device;
    two control pistons within said bores connected by said interconnecting means between said souce, said reservoir, and said servo motor, each control piston being associated with one working space of said servo motor, each control piston having control edges, a reaction area and a cavity, said control edges controlling the flow of fluid to and from said working spaces, each of said fingers of said power input member engaging one cavity of one control piston to manually move the control pistons upon a relative movement of said power input member;
    an elastic resilient connecting means for directly connecting said power input member and said power output member; and
    a stabilizing means for holding a predetermined initial pressure in said working spaces when control pistons are in a neutral position;
    the inventive improvement comprising:
        the sizing of said cavities in relation to said fingers such that there exists, in the neutral position of said control pistons, a gap allowing free play of said fingers in both operational directions before said fingers contact and mechanically move said control pistons, and
        said stabilizing means comprising a plate member fixed to said output member and springs interposed between said plate member and said control pistons, said springs balance the force exerted by the initial pressure upon said reaction areas of said control pistons.

2. The hydraulic pressure-regulating system according to claim 1, wherein each of said control pistons contains a bore and said spring which stresses the control pistons is guided with a portion of its length in said bore, which extends from a front portion of said control piston located opposite the reaction area, and said plate member covers at least partially said piston bores.

3. The hydraulic pressure control system according to claim 1 wherein all control edges which are required for controlling the pressure are positioned on that side of the control piston which, with regard to the fingers, is facing away from the reaction area.

4. The hydraulic pressure control system according to claim 1 wherein the fingers are arranged in a space which communicates with the reservoir.

5. The hydraulic pressure control system according to claim 2 wherein all control edges which are required for controlling the pressure are positioned on that side of the control piston which, with regard to the fingers, is facing away from the reaction area.

6. The hydraulic pressure control system according to claim 3 wherein the control pistons consist of at least two parts, one of which is screwed into the other and one of which being a piston portion comprising said cavities, the other one being a control portion comprising said control edges.

7. The hydraulic pressure control system according to claim 6 wherein for preventing double-centering the piston portion is provided in a surrounding bore with radial play.

8. The hydraulic pressure control system according to claim 6 wherein a securing means is provided between the piston portion and the control portion in order to prevent relative rotation between the control portion and the piston portion.

* * * * *